United States Patent Office 3,453,081
Patented July 1, 1969

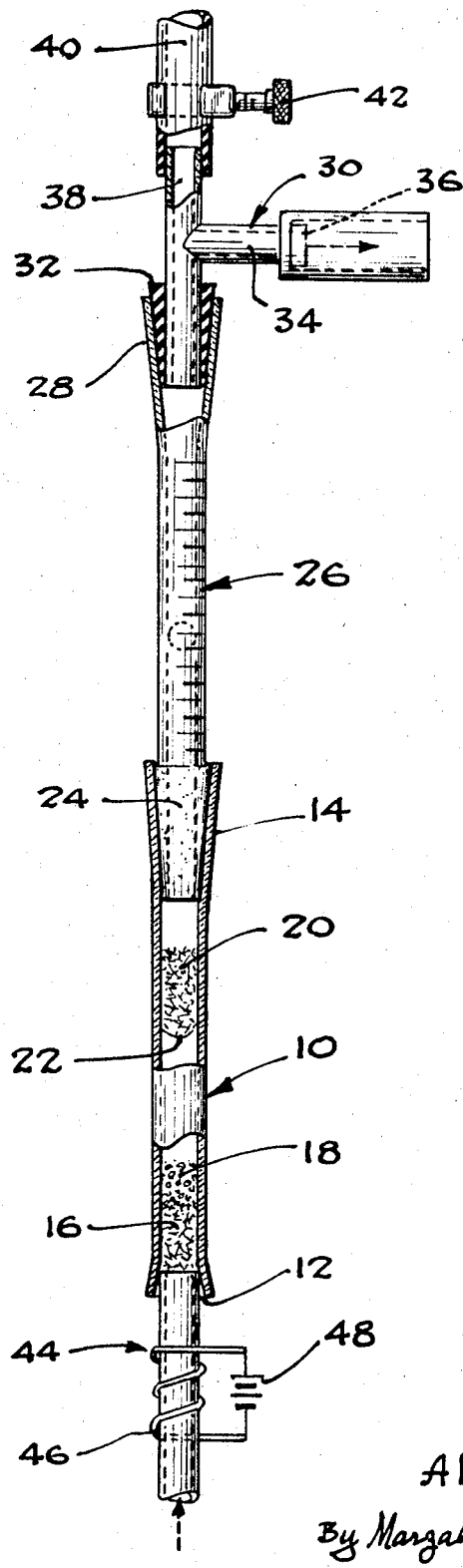

3,453,081
METHOD AND APPARATUS FOR DETERMINING THE PRESENCE OF VOLATILE ORGANIC LEAD COMPOUNDS IN THE ATMOSPHERE
Alfred O. Walker, Lake Jackson, Tex., assignor to Nalco Chemical Company, Chicago, Ill., a corporation of Delaware
Filed July 23, 1965, Ser. No. 474,268
Int. Cl. G01n 31/22, 31/00
U.S. Cl. 23—232  3 Claims

ABSTRACT OF THE DISCLOSURE

A method for determining the presence and quantities of volatile organic lead compounds. Air suspected as containing such compounds is passed over iodine crystals to sublime at least one-half thereof. Lead iodine compounds are formed and cooled on a porous substrate. Free iodine is removed from the substrate; thereby developing a yellow color on the substrate if lead was present in the air.

---

This invention relates to a method and apparatus for determining the presence and quantity of volatile organic lead compounds such as tetraethyl and tetramethyl lead in the atmosphere.

Several methods have been proposed for determining the presence and concentration of volatile lead compounds in the atmosphere. See, for example, U.S. Patent 3,071,446 and the article by Snyder et al. appearing in Analytical Chemistry, volume 20, pages 772–776 (1948).

The methods described in the above references require the performance of several procedural steps before the actual determination of lead in an air sample can be made. These steps are complex and require a trained chemical operator to perform them.

The present invention, on the other hand, makes use of a relatively simple apparatus which can be operated to determine the presence and quantity of volatile lead impurities in the atmosphere which can be operated by a person not skilled in the field of chemistry. After a few hours of training, any person of reasonable intelligence can be taught to operate the apparatus to make determinations of the quantity of volatile lead compounds contained in the atmosphere. It, therefore, becomes an object of the invention to provide an improved and simplified method and apparatus for determining the presence and quantity of volatile lead compounds in the atmosphere.

Another object of the invention is to provide an improved method and apparatus for determining the quantity of volatile organic lead compounds in the atmosphere which may be operated by a nonskilled person. Other objects will appear hereinafter.

In accordance with the invention it has been found that presence and quantity of volatile organic lead compounds in the atmosphere may be determined by passing a regulated stream of the air to be sampled over iodine crystals for a period of time and at a temperature sufficient to sublime at least one half of the iodine crystals but not all of them. While the air is passing over the iodine crystals they sublime and carry with them the re-action product of the iodine and the volatile organic lead compounds. The volatile lead compounds are continually collected on a porous substrate. After the iodine has sufficiently sublimed, the porous substrate is then developed, preferably by passing a quantity of air over the substrate to remove any free iodine therefrom, thereby revealing a yellow color. This yellow color is an indicium of the presence of volatile organic lead compounds in the air sampled and also their concentration. By using similar porous substrates which have been treated with known quantities of lead iodine containing compounds, the amount of lead contained in the air sample may be readily determined by visual color comparison.

For a more comprehensive understanding of the invention reference may be had to the drawing which is a vertical view, broken away in part and schematic in part, which advantageously demonstrates the invention.

The apparatus shown in the drawing comprises a sampling tube 10 which has an air inlet 12 and an air outlet 14. Near the air inlet is a porous support 16 upon which is placed iodine crystals 18. Positioned above the iodine crystals is a porous substrate 20 which is capable of retaining lead iodine compounds and free iodine.

Both the porous support 16 and the porous substrate 20 are preferably constructed of a chemically inert material such as glass wool or fiber glass matting. The bottom 22 of the porous substrate 20 is preferably hemispherical which increases its surface area.

Connected to the outlet 14 of the sample tube by means of a ground joint 24 is a flow meter 26. At the outlet 28 thereof, a T 30 is fitted thereto by means of rubber stopper 32. The side arm 34 of the T is connected to a suitable air moving or vacuum device such as aspirator 36. The outlet 38 of the T is fitted with a rubber or plastic tube 40 to which is affixed a closing means such as screw clamp 42.

An optional feature of the invention resides in the utilization of air heating means 44 which is a hollow tube fitted to inlet 12 of the sampling tube 10. Affixed to the heater is a heating coil 46 which is connected to a suitable power source 48.

In operation, air to be sampled for the presence and quantity of volatile organic lead compounds is drawn into the sampling tube through inlet 12 by the suction applied to the system by operation of the aspirator 36. The particular quantity of air passing through the sample tube is regulated by the opening or closure of the screw clamp 42. The exact amount may be regulated carefully by adjusting the screw clamp and observing the operation of the flow meter 26. As the air passes in to the sample tube, the iodine is sublimed and reacts with the volatile organic lead compounds to form lead iodine compounds. Both the lead iodine compounds and the free iodine are captured by the porous substrate 20.

The amount of iodine used should be an amount which will be at least half sublimed at the end of a particular test period. In most cases one hour is adequate. If a larger amount of iodine is used the volatile lead iodine compound is not completely released and will not be observed on the test plug. Obviously, enough iodine must be present at the end of the test to still react with any lead compounds present in the air being tested. In preparing the sample tube, a typical embodiment of the invention would use a glass tube approximately 5 inches long having a 7 mm. interior diameter. It would then be fitted with a 2 centimeter plug of glass wool so arranged that the hemispherical surface previously mentioned is toward the upstream direction. This plug is used to filter the lead iodine. About one-half cm. of iodine crystal would then be added to the tube and another glass wool plug inserted leaving about one inch space between the two plugs. The flow rate of air through the crystals should be sufficient to cause them to tumble. In the apparatus described a flow rate of 5–6 cu. ft. per hour is satisfactory.

It will be understood that the above is only illustrative of a typical sample tube and that it may be constructed of different size tubing and that the amount of iodine crystals used will be capable of variation depending upon the temperature of the incoming air, the flow rate of the air and the surface area of the iodine crystals exposed to the air. These calculations may be readily made utilizing well known information with respect to the vapor pressure of iodine. See, for example, page 44 of "General Chemistry" by Linus Pauling, W. H. Freeman & Co., 1958.

After the test has been run for a sufficient period of time, the sample tube is removed from the apparatus and placed on the outlet 38 of the T 34.

The air current is then allowed to pass through the sample tube in a reverse direction which effectuates removal of free iodine from the glass wool from the porous substrate 20. This allows the development of a yellow color in the porous substrate 20, thereby indicating the presence of volatile organic lead compounds in the air sample. Intensity of color in the substrate is then compared with standardized substrates to determine the concentration of lead in micrograms per cubic foot. The standards may be prepared by inserting the end of a sample plug into a quart bottle to which has been added a standard lead containing solution. This permits the quantity of lead drawn through the sample tube to be determined by visual comparison with the thus prepared standard plugs.

The yellow color developed on the porous substrate is believed to be caused by the formation of lead iodide. It is well known that when alkyl lead compounds are reacted with halogens at about room temperature, a complex series of reactions occur with one of the final products being a lead iodide. When the air flow is reversed through the substrate to remove free iodine, the yellow color becomes clearly visible due to the removal of the brown color caused by the free iodine.

When it is desired to determine only the presence of a minimum amount of volatile organic lead compounds in the atmosphere, the described apparatus may be slightly modified to achieve this result. When it is desired to determine the presence of at least 4 micrograms per cubic foot, the sampling tube is made of a transparent material and is packed with large amounts of iodine and air to be sampled is passed therethrough for a longer period of time. If an amount in excess of 4 micrograms per cubic foot of volatile organic lead compound is present, a yellow color will become visible on the walls of the sampling tube in about 24 hours. To develop this yellow color during the 24-hour period, a lower flow rate should be employed. In a typical embodiment, a flow rate of 2–3 cubic feet per hour would be used in an 8 millimeter diameter sampling tube which contains 2–3 inches of iodine crystals. For this simpler qualitative type test, it is desirable that the apparatus be run for a minimum of 12 hours.

Best results are obtained in the practice of the invention when the iodine crystals have been purified by resublimation which removes undesirable contaminants therefrom.

The apparatus thus described may be utilized in laboratories, manufacturing plants, refineries and other areas where there is danger of undesirable lead levels existing in the atmosphere. The test is simple, the apparatus easily constructed and may be operated by an untrained operator only after a few hours of instruction.

The invention is claimed as follows:

1. A method for determining the presence and quantity of volatile organic lead compounds in the atmosphere which comprises the steps of passing a regulated stream of air over iodine crystals, for a period of time and at a temperature sufficient to sublime at least one-half of the iodine crystals but not all of them, whereby lead iodine compounds are formed, collecting the lead-iodine compounds and free iodine released from the iodine crystals on a porous substrate, removing free iodine from the porous substrate thereby developing a yellow color on the porous substrate and then color comparing the color with a color comparator which is calibrated to show the percentage of volatile organic lead compounds in relation to the particular shade of yellow developed on the porous substrate.

2. The method of claim 1 where the iodine is removed from the porous substrate by contacting said substrate with a stream of moving air.

3. A method for determining the presence of at least 4 micrograms per cubic foot of organic lead compounds in the atmosphere which comprises the steps of passing a regulated stream of air through a transparent tube packed with iodine crystals for at least 12 hours and then observing whether a yellow color develops on the inner surface of said tube.

References Cited

UNITED STATES PATENTS 3,025,142   3/1962   Williams _____ 23—232

MORRIS O. WOLK, Primary Examiner.

E. A. KATZ, Assistant Examiner.

U.S. Cl. X.R.

23—97, 230, 254; 252—408; 260—437